United States Patent [19]

Leo et al.

[11] 4,143,946

[45] Mar. 13, 1979

[54] IMPINGEMENT COOLED DEFORMABLE LASER MIRROR

[75] Inventors: Bruno S. Leo, Santa Monica; Chang P. Liu, Rancho Palos Verdes, both of Calif.

[73] Assignee: The United States of America as represented by the Secretary of the Navy, Washington, D.C.

[21] Appl. No.: 857,723

[22] Filed: Dec. 5, 1977

[51] Int. Cl.² .............................................. G02B 5/08
[52] U.S. Cl. .................................. 350/310; 350/295
[58] Field of Search ......................... 350/288, 295, 310

[56] References Cited

U.S. PATENT DOCUMENTS

| 3,644,020 | 2/1972 | Shannon | 350/295 |
| 4,003,640 | 1/1977 | Hansen | 350/310 |

*Primary Examiner*—F. L. Evans
*Attorney, Agent, or Firm*—R. Sciascia; R. Beers; S. Sheinbein

[57] ABSTRACT

The reflective mirror face plate of a deformable adaptable mirror for laser systems is cooled by an improved heat exchange apparatus. In accordance with the invention jets of cooling fluid impinge normal to the face plate in addition to coolant flowing parallel to the surface of the face plate. Coolant manifolding is provided within the mirror allowing the coolant to flow through a nozzle plate and thereafter impinge and spread over a knurled back surface of the reflective plate. Electromagnetic actuators act on control rods to transmit forces to the face plate thus controlling its curvature to produce optimum laser beam reflection.

8 Claims, 1 Drawing Figure

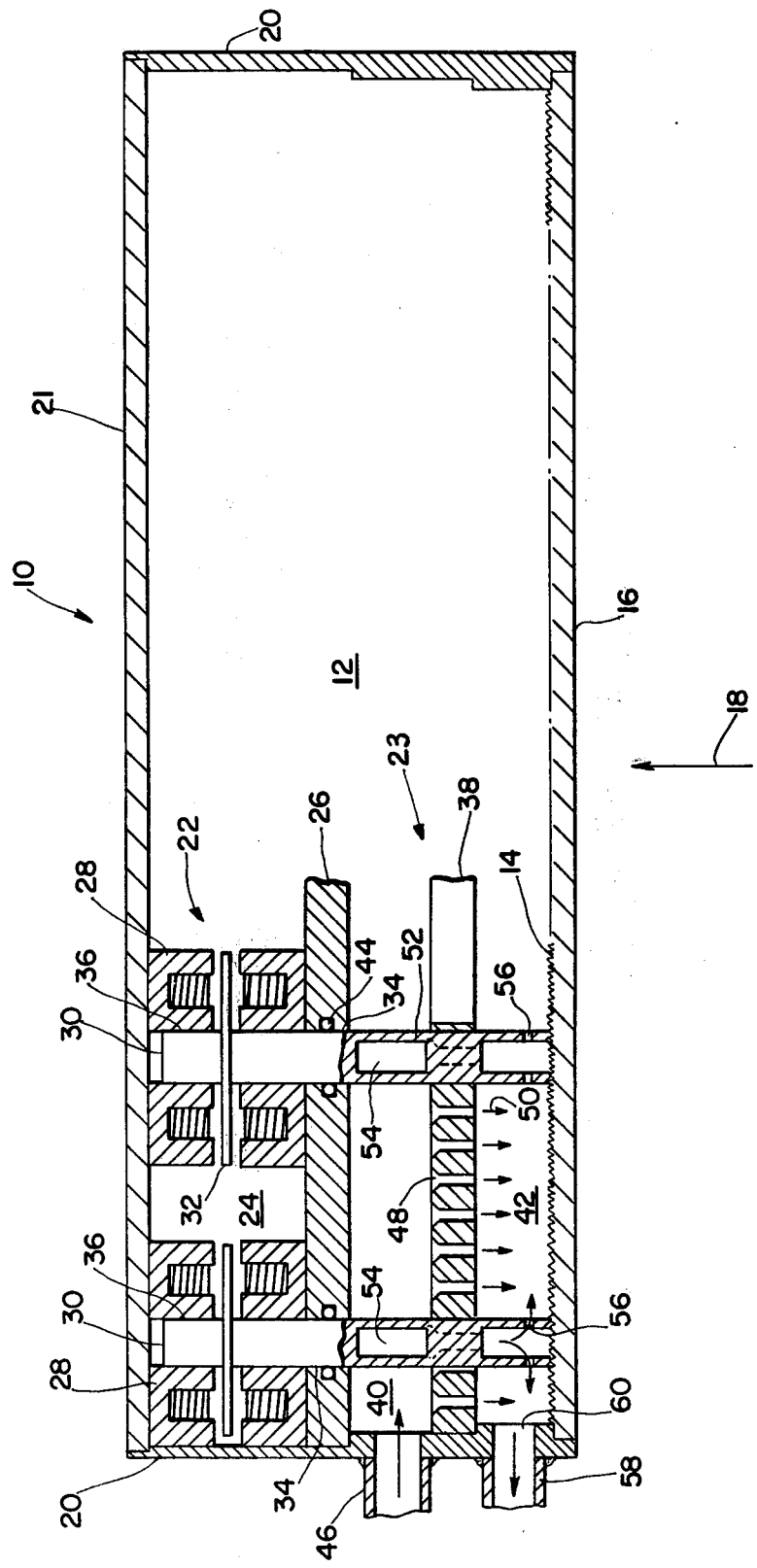

IMPINGEMENT COOLED DEFORMABLE LASER MIRROR

BACKGROUND OF THE INVENTION

This invention relates to optical mirrors and is particularly directed to fluid-cooled mirrors utilized in laser systems.

Metallic mirrors are commonly used to focus, deflect or change the shape of laser beams. One system for aiming a laser beam and focusing it on a target, described in U.S. Pat. No. 3,514,776 to Mulready, includes a concave mirror having an adjustable reflecting concave face which is capable of being aimed at the target. The curvature of the reflecting surface of the mirror can be adjusted by pressure or mechanical means. Similar systems such as the ones disclosed in U.S. Pat. No. 2,555,387 to Zobel and U.S. Pat. No. 3,967,899 to O'Meara additionally utilize magnetic or electrical actuators, respectively, to modify mirror face plate geometry. However, none of the prior patents mentioned show any means for compensating for thermal distortions. As is evident to one of ordinary skill in the art, these thermal distortions are a result of the stresses induced in the structural material of the mirror as it absorbs some of the radiant energy of an impinging laser beam. Thus the actuators modifying face plate geometry must not only be able to supply prerequisite mechanical forces to manipulate the curvature of a mirror's front face but must also provide sufficient mechanical forces to compensate for the induced thermal stresses. Thus the design of the actuators tend to be complicated and expensive.

Typically, the mirrors which are subjected to intense heat by the laser beam require cooling of the optically reflective surface of the mirror since only minimal thermal distortion thereof due to differential temperatures can be permitted. Examples of liquid cooled mirrors include U.S. Pat. No. 3,637,296 to McLafferty et al. and U.S. Pat. No. 3,731,992 to Mansell. However a disadvantage of these mirror structures lies in the location of the inlet and outlet manifolds which allow uneven heat exchange to exist over the mirror surface. Such differential cooling could cause slight distortion of the mirror surface and thus undesirable distortion of the reflected laser beam. Other methods such as shown in U.S. Pat. No. 3,923,383 to Engel et al, U.S. Pat. No. 3,884,558 to Dunn, III et al, and U.S. Pat. No. 3,708,223 to Sorensen et al. use complicated manifolding designs in attempting to achieve uniform heat exchange. However, inasmuch as these mirrors are cooled parallel to their back surfaces hot spots on the mirror can not be effectively obviated. Hence, both axial and radial temperature gradients still exist creating high thermal stresses. Also, mirror deflections are not controlled by face plate geometry adjustments so that optimum laser beam reflection is unobtainable with the above referenced patents. Large pressure is required to force the coolant through its channels resulting in large forces acting on the mirror. Thus, the above systems are structurally heavy inasmuch as the mirror systems must resist the high pressure coolants. Finally, the strength requirements imposed by the high pressure cooling systems and the complexity of the manifold designs result in high manufacturing costs.

SUMMARY OF THE INVENTION

It is accordingly an object of the present invention to provide an improved optical mirror.

Another object the instant invention is to provide an improved cooling system for optical mirrors.

An additional object of the present invention is to provide means for minimizing thermal distortion of and adjusting the face plate geometry of optical mirrors.

Still another object of the present invention is to provide a laser mirror cooling system operating at low coolant pressures thus resulting in a simple and light weight mirror design.

A final object of the present invention is to provide a mirror design which will obtain thermal and mechanical control over the face plate in order to secure optimum laser beam reflection in a simple and effective manner.

These and other objects are attained in the present invention by providing a mirror wherein the face plate geometry is cooled by jets of coolant impinging normally to the face plate. Coolant expands through a nozzle plate thereafter impinging normally and spreading over the knurled back surface of the face plate. Very effective cooling is achieved due to the effect of the knurled surface on the heat transfer characteristics of the impinging jets. Nozzle diameters in the nozzle plate can vary over the nozzle plate so that the cooling rate over the face plate varies thereby minimizing thermal distortions caused by uneven power distribution in the oncoming laser beam. Inlet and outlet manifolding provides for coolant flow in a housing attached to the mirror face plate. Magnetic actuators positioned in the housing act on control rods to transmit forces to the mirror face plate thus controlling mirror geometry so that thermal and pressure distortions can additionally be minimized.

BRIEF DESCRIPTION OF THE DRAWING

The sole FIGURE is a diagrammatic illustration of an impingement cooled deformable mirror embodying the present invention.

DETAILED DESCRIPTION OF THE PREFERRED EMBODIMENT

As shown in the drawing, a mirror apparatus is generally indicated at 10. Such mirror apparatus is made up of a hollow body or housing 12 secured to the rearward face 14 of a reflective mirror surface or face plate 16. Housing 12 comprises sides 20 and removable back cover 21 and may be of any desired geometric configuration. Cover 21 may, of course, be attachable to sides 20 using any suitable fasteners while sides 20 form a fluid-tight seal with respect to rearward face 14 for a reason which will be subsequently understood. Face plate 16 is comprised of any suitable polished metal, such a copper and is therefore subject to undesirable thermal distortions caused by the impinging radiant energy of an oncoming beam of light such as laser beam 18.

In order to minimize axial and radial temperature gradients in the mirror and to control mirror deflections, therefore, heat exchange means, generally designated 23, and face plate geometry adjusting means 22, respectively, are installed within housing 12. A sealed first compartment 24 encloses face plate geometry means 22 and is defined within housing 12 by cover 21 and a plate 26 sealingly fixed to sides 20. Disposed within compartment 24 are a plurality of electro-magnetic actuators 28 which activate translatable push-pull control rods 30. Rods 30, which are fixed, as by brazing, to rearward face 14, move under the influence of actuators 28 to modify the geometry of face plate 16.

The number and distribution pattern of the actuators 28 and corresponding rods 30 is selected so as to ensure that face plate 16 geometry is sufficiently controlled to obtain optimum laser beam reflection. The actuation force is supplied by the electromagnetic actuators 28 which operate on a magnetic disc 32 fixed on each rod 30 which are constructed of a non-magnetic material. The extent of the upward and downward movement of the control rods and thus the amount of the "push" and "pulling" on the face plate 16 is substantially determined by the degrees to which each disc 32 can be influenced by the P and N pole of an actuator 28. Of course, each electro-magnetic actuator is individually controllable be means of a control system, not shown, in order to obtain desired face plate geometry.

Each push-pull control rod 30 is slidingly supported by its corresponding actuator, as at 36, and by passages 34 formed in plate 26. Rods 30 are further slidingly and sealingly supported by a nozzle plate 38 which divides the remainder of housing 12 into a cooling fluid inlet compartment 40 and a coolant distribution compartment 42. Fluid entry into compartment 24, past rods 30, is prevented by sealing means formed in plate 26, e.g. O-rings 44.

Cooling fluid entry into compartment 40 is effectuated by an inlet manifold 46 which communicates with the inlet compartment via a port located in a side 20 of housing 12. The fluid then passes through a plurality of nozzle 48 formed in the nozzle plate 38 thereby producing a multiplicity of jets of coolant, indicated by arrows 50, which pass through distribution chamber 42 on their way to impinge normally upon rearward surface 14 of face plate 16. After impinging on surface 14 the coolant spreads over the surface to further substantially eliminate the production of hot areas on the face plate due to uneven power distribution in the beam alignment. The impinging jets create a turbulence in the coolant flow for more efficient heat transfer from the reflective mirror surface 16 to the coolant.

Jet cooling characteristics can be controlled, e.g., by varying the nozzle diameter in nozzle plate 38. Surface 14 may be roughened, e.g. by knurling, in order to further enhance the cooling characteristics of the impinging jets of coolant and thereby increase the heat transfer rate between the face plate and the coolant. Additional cooling can be supplied by providing each control rod 30 with a tubular portion 52 between plate 26 and rearward surface 14. A plurality of inlet ports 54 in portion 52, communicating with inlet compartment 40, and orifices 56, circumferentially arranged in the section of tubular portion 52 contiguous to surface 14, allow coolant to flow parallel to rearward surface 14. Spent cooling fluid from the normal coolant jets and the parallel coolant flow exit housing 12 through outlet manifold 58 which communicates with outlet port 60.

Since the jet velocity is relatively small, the pressure drop across each nozzle is also small, e.g. about 20 psi – 30 psi for a water coolant. Of course, other fluids other than water could be used. Furthermore, the mirror face plate is effectively cooled using a coolant pressure of only 2–8% of the now required 300 psi for present mirrors. The advantages of these fluid characteristics allows the use of a low pressure structure thereby reducing the weight of the mirror. The electromagnetic actuators thus need overcome only negligible forces induced in the mirror structure due to the low pressure coolant. Also, because of its simple design manufacturing, costs for the mirror are lower than that of present mirrors.

What has been disclosed is a simple and effective mirror which can be used in laser systems so that thermal and mechanical control can be obtained over the mirror's face plate in order to secure optimum laser beam reflection.

Although the invention has been described with reference to a particular embodiment, it will be understood to those skilled in the art that this invention is also capable of a variety of alternate embodiments within the spirit and scope of the appended claims.

What is desired to be secured by Letters Patent of the United States is:

1. An impingement cooled deformable laser mirror comprising:
    a face plate having first and second faces;
    an optically reflective surface formed on said first face;
    said face plate being capable of being deformed to secure optimum beam reflection of a beam of light;
    a control housing attached to said face plate contiguous to said second face;
    means positioned in said housing for controlling face plate geometry;
    means providing inlet and outlet chambers for conducting coolant into and out of said housing;
    a nozzle plate supported in said housing, said nozzle plate having a uniform array of fluid nozzles distributed therein, for providing impinging fluid jets of coolant normal to said second face;
    whereby undesirable thermal distortions in face plate geometry caused by the reflection of said light beam are substantially precluded.

2. The mirror of claim 1 wherein said nozzle plate has first and second surfaces;
    said first surface being in fluid communication with said inlet chamber;
    said second surface being in fluid communication with said outlet chamber.

3. The mirror of claim 1 wherein the diameter of said nozzles vary across the nozzle plate so as to insure uniform cooling characteristics of said face plate.

4. The mirror of claim 1 wherein the surface of said second face is knurled;
    whereby very effective and increased cooling of said face plate is achieved due to the greater surface area of said second face.

5. The mirror of claim 1 wherein the pressure of said coolant is between 6 psi and 24 psi;
    whereby the forces needed to control said face plate geometry is minimized.

6. The mirror of claim 5 wherein the pressure drop of said coolant across each nozzle of said nozzle plate is between 20 psi and 30 psi.

7. The mirror of claim 2 wherein said means for controlling face plate geometry comprises a plurality of electro-magnetic actuators located in an actuator chamber positioned in said housing contiguous to said inlet chamber;
    each of said actuators manipulating push-pull control rods attached to said second face.

8. The mirror of claim 7 wherein each of said rods are comprised by a tubular element, said tubular element having an inlet portion communicating with said inlet chamber and an outlet portion contiguous to said second face for directing coolant parallel to said second face, said outlet portion being in fluid communication with said outlet chamber;

whereby coolant flows into said tubular element and exits from said outlet portion parallel to said second face in order to cool said face plate.

* * * * *